(12) United States Patent
Oigawa et al.

(10) Patent No.: US 9,097,906 B2
(45) Date of Patent: Aug. 4, 2015

(54) OPTICAL ELEMENT

(75) Inventors: Makoto Oigawa, Kawasaki (JP); Tomohiro Yamada, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/143,523

(22) PCT Filed: Jan. 13, 2010

(86) PCT No.: PCT/JP2010/000128
§ 371 (c)(1),
(2), (4) Date: Jul. 6, 2011

(87) PCT Pub. No.: WO2010/082474
PCT Pub. Date: Jul. 22, 2010

(65) Prior Publication Data
US 2011/0273771 A1   Nov. 10, 2011

(30) Foreign Application Priority Data
Jan. 13, 2009   (JP) .................................. 2009-004757

(51) Int. Cl.
G02B 5/30       (2006.01)
G02B 27/28      (2006.01)
G02B 5/18       (2006.01)
H04N 9/31       (2006.01)

(52) U.S. Cl.
CPC ............ *G02B 27/283* (2013.01); *G02B 5/1809* (2013.01); *G02B 5/3058* (2013.01); *H04N 9/3105* (2013.01); *H04N 9/3167* (2013.01); *H04N 9/3197* (2013.01)

(58) Field of Classification Search
CPC ............................ G02B 5/3058; G02B 27/283
USPC ............. 359/485.01, 485.05, 485.06, 491.01; 353/20
See application file for complete search history.

(56) References Cited

U.S. PATENT DOCUMENTS 4,289,381 A * 9/1981 Garvin et al. ............... 427/163.1
5,383,053 A * 1/1995 Hegg et al. ............... 359/485.05
(Continued)

FOREIGN PATENT DOCUMENTS

EP       1976399 A2    6/2007
JP     H11-183727 A    7/1999
(Continued)

OTHER PUBLICATIONS

Sharp et al., "LCoS Projection Color Management Using Retarder Stack Technology" Displays, 2002, pp. 139-144, vol. 23, Elsevier Science B.V.

(Continued)

*Primary Examiner* — Ricky D Shafer
(74) *Attorney, Agent, or Firm* — Canon USA Inc. IP Division

(57) ABSTRACT

An optical element includes a substrate including a first surface and metal structure group including a plurality of metal structures, the metal structures being arranged on the first surface in a two-dimensionally isolated manner. Light is incident on the metal structure group in an oblique manner with respect to the normal of the first surface from the metal-structure-group side or the substrate side, so that a polarization state of light that passes through the metal structure group and a polarization state of light that is reflected by the metal structure group differ from each other in accordance with a wavelength range.

11 Claims, 15 Drawing Sheets

(56) References Cited

U.S. PATENT DOCUMENTS

| | | | |
|---|---|---|---|
| 5,973,316 A | 10/1999 | Ebbesen et al. | |
| 6,108,131 A * | 8/2000 | Hansen et al. | 359/485.05 |
| 6,122,103 A * | 9/2000 | Perkins et al. | 359/485.03 |
| 6,288,840 B1 * | 9/2001 | Perkins et al. | 359/485.03 |
| 6,447,120 B1 * | 9/2002 | Hansen et al. | 353/20 |
| 6,693,749 B2 * | 2/2004 | King et al. | 359/630 |
| 6,785,050 B2 * | 8/2004 | Lines et al. | 359/485.03 |
| 6,829,090 B2 * | 12/2004 | Katsumata et al. | 359/485.04 |
| 7,116,478 B2 * | 10/2006 | Momoki et al. | 359/485.05 |
| 7,130,120 B2 * | 10/2006 | Katsumata et al. | 359/485.04 |
| 7,414,784 B2 * | 8/2008 | Mi et al. | 359/485.05 |
| 7,570,424 B2 * | 8/2009 | Perkins et al. | 359/485.05 |
| 2004/0008416 A1 * | 1/2004 | Okuno | 359/566 |
| 2006/0262398 A1 | 11/2006 | Sangu et al. | |
| 2006/0279842 A1 * | 12/2006 | Kim et al. | 359/487 |
| 2007/0035700 A1 | 2/2007 | Stahl et al. | |
| 2007/0242352 A1 * | 10/2007 | MacMaster | 359/486 |
| 2008/0252799 A1 * | 10/2008 | Lee et al. | 349/5 |

FOREIGN PATENT DOCUMENTS

| | | |
|---|---|---|
| JP | 2001-124927 A | 5/2001 |
| JP | 2001-154152 A | 6/2001 |
| JP | 2002-372686 A | 12/2002 |
| JP | 2008-026807 A | 2/2008 |

OTHER PUBLICATIONS

Barnes et al., "Surface Plasmon Subwavelength Optics" Nature, Aug. 14, 2003, pp. 824-830, vol. 424.

* cited by examiner

OPTICAL ELEMENT

TECHNICAL FIELD

The present invention relates to an optical element that provides a wavelength-selective polarization separating function by using localized surface plasmon resonance (LSPR).

BACKGROUND ART

Various projecting devices, such as liquid crystal projectors, including image displaying elements, such as liquid crystal display elements, have been proposed. For example, Japanese Patent Laid-Open No. 2001-154152 discusses a projecting device including a reflective liquid crystal display element (liquid crystal on silicon (LCOS)).

In such a projecting device, a color separating-combining optical system is disposed between an illumination optical system and a projection optical system to project a color image based on lights of three colors, i.e., R-light, G-light, and B-light. A plurality of polarization beam splitters (PBSs) are arranged in the color separating-combining optical system together with dichroic mirrors or a dichroic prism.

The dichroic mirrors or the dichroic prism performs a color separating-combining operation, and light is separated or combined by the PBSs in accordance with the polarization state. Therefore, as described in Japanese Patent Laid-Open No. 2001-154152 and Displays, Vol. 23, 139, 2002, an optical system is constituted by a plurality of PBSs and dichroic prism/mirrors. In general, the color separating-combining function is provided by multilayered dielectric films or colorant.

Wavelength-selective optical filters using metal structures instead of the multilayered dielectric films or colorant are disclosed in U.S. Pat. No. 5,973,316 and Nature, Vol. 424, 14 Aug. 2003. These optical filters are hole-type optical filters in which openings are periodically arranged in a thin metal film and wavelength selection is performed by using surface plasmon. According to Nature, Vol. 424, 14 Aug. 2003, an RGB transmission spectrum can be obtained by a hole-type optical filter using the surface plasmon. More specifically, it is disclosed that a transmission spectrum with wavelengths of 436 nm (blue), 538 nm (green), and 627 nm (red) can be obtained by using a thin metal film with a sub-wavelength array of openings.

A color separating-combining optical system included in a projecting device, such as a liquid crystal projector described in Japanese Patent Laid-Open No. 2001-154152, has a problem that a large number of components are required. This is because the incident light is divided into s-polarized light and p-polarized light, which are output as outgoing light, in a specific wavelength range for which each PBS is designed, and both the s-polarized light and p-polarized light are reflected or transmitted in wavelength ranges other than the specific wavelength range. More specifically, as shown in FIG. 15, the p-polarized light and the s-polarized light are adequately separated from each other only in a wavelength range of, for example, 500 nm to 600 nm. In this wavelength range, the p-polarized light is transmitted while the s-polarized light is reflected. Therefore, a wavelength-selective filter or the like is necessary to use light in this wavelength range.

In other words, in the color separating-combining optical system, dichroic mirrors or a dichroic prism having a wavelength-selective transmitting function must be provided in addition to the PBSs to perform the light separating-combining operation for desired wavelength range. As a result, the number of components increases.

Therefore, it is desirable to provide an optical element having both the wavelength selecting function and the light separating-combining function in accordance with the polarization state.

In U.S. Pat. No. 5,973,316 and Nature Vol. 424, 14 Aug. 2003, holes are periodically arranged in a thin metal film having a relatively large area to provide a filter having a transmission spectrum that depends on the wavelength of surface plasmon induced on the metal surface.

However, in such a hole-type thin-metal-film filter, large light absorption occurs since the area occupied by the metal is large. Therefore, in the thin-metal-film filter described in U.S. Pat. No. 5,973,316, the transmittance is about 5 to 6 percent even at the highest peak.

To use the transmission spectrum obtained by such a filter with a relatively low transmittance, the intensity of the incident light must be increased to ensure the intensity of the transmission spectrum. Therefore, there is a possibility that the energy efficiency of a device including the hole-type filter will be low. In particular, although the amount of light absorption by the metal is relatively small in a microwave range, the amount of light absorption by the metal is large in a visible light range. Therefore, in the case where the hole-type thin-metal-film filter is used as a transmission filter for the visible light range, the scope of application of the filter to the actual device is limited.

Similarly, also when the hole-type filter is used as a reflection filter for the visible light range, the contrast of the reflected light relative to the transmitted light is low. Therefore, the hole-type optical elements including metal structure layers described in U.S. Pat. No. 5,973,316 and Nature, Vol. 424, 14 Aug. 2003 cannot be used as optical elements which provide sufficient amount of transmitted light or sufficient contrast of reflected light.

CITATION LIST

Patent Literature

PTL 1: Japanese Patent Laid-Open No. 2001-154152
PTL 2: U.S. Pat. No. 5,973,316

Non Patent Literature

NPL 1: Displays, Vol. 23, 139, 2002
NPL 2: Nature, Vol. 424, 14 Aug. 2003

SUMMARY OF INVENTION

The present invention provides an optical element which includes a substrate including a first surface and metal structure group including a plurality of metal structures, the metal structures being arranged on the first surface in a two-dimensionally isolated manner. Light is incident on the metal structure group in an oblique manner with respect to the normal of the first surface from the metal-structure-group side or the substrate side, so that a polarization state of light that passes through the metal structure group and a polarization state of light that is reflected by the metal structure group differ from each other in accordance with a wavelength range.

The present invention provides a single optical element having both a wavelength selecting function and a light separating-combining function in accordance with the polarization state. In other words, an optical element having a wavelength-selective polarization separating function (wavelength-selective PBS) can be provided. Accordingly, the number of components included in a color separating-combining optical system can be reduced.

DESCRIPTION OF EMBODIMENTS

The inventors of the present invention have found the fact that when light is obliquely incident on a dot-type wavelength-selective optical element in which metal structures are periodically arranged on a substrate made of a dielectric material or the like, the transmittance and reflectance vary depending on the polarization state at each of the selected wavelengths. An optical element according to the present invention is based on the above-mentioned fact found by the inventors.

An example of application of the optical element according to the present invention is a wavelength-selective PBS using the localized surface plasmon resonance (LSPR).

Metal particles, in particular, particles with dimensions equal to or smaller than the wavelength of light, are capable of generating the localized surface plasmon resonance (LSPR).

Plasmon is a collective oscillation of free electrons on metal surfaces, and is excited by an external electrical field, such as light. Since the electrons are charged, when the electrons are oscillated, polarization is generated by density distribution of the free electrons. Coupling of the polarization and the electromagnetic field is called plasmon resonance. In particular, resonance between the light and plasma oscillation of free electrons on the metal particle surfaces or metal structures is called the localized surface plasmon resonance (LSPR).

The collective oscillation of free electrons on the metal particle surfaces is excited by an external electrical field, such as light. The density distribution of the electrons is generated by the oscillation, and the polarization is generated accordingly. Thus, an electromagnetic field localized in the areas near the particles is generated. As compared with a hole-type optical element, a dot-type optical element, in which a plurality of metal structures are arranged (for example, periodically) on a dielectric substrate, has a smaller metal area if the areas of the optical elements are the same.

Therefore, the substantial size of the openings can be increased and the amount of light absorption by the metal can be reduced. As a result, the overall transmittance and reflectance of the dot-type optical element are higher than those of the hole-type optical element.

The present invention will be described with reference to the drawings.

Figure 1:
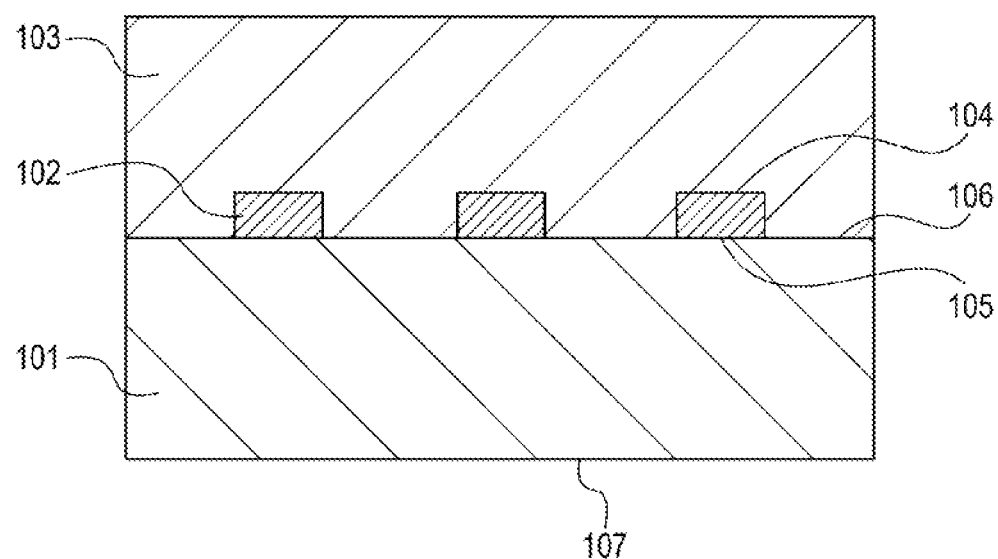
FIG. 1 is a schematic diagram illustrating an embodiment.

FIG. 1 is a schematic diagram illustrating a dot-type optical element in which a plurality of metal structures 102 are arranged (for example, periodically) on a substrate (for example, a dielectric substrate) 101. The substrate 101 includes a first surface 106 and a surface 107 at the side opposite to the first surface 106.

According to the structure shown in FIG. 1, a transmission spectrum having a relative minimum of transmittance at a specific wavelength can be obtained. This is because light with the specific wavelength is absorbed or scattered owing to the localized surface plasmon resonance (LSPR). The LSPR can be obtained even when the metal structures are small if the thickness of the metal structures is several nanometers or more.

When light is obliquely incident on the optical element, the transmittance and reflectance vary in accordance with the polarization state. In other words, an optical element having both a wavelength selecting function of a color filter and a polarization separating-combining function of a PBS can be designed.

This is because s-polarized light, in which the electric field oscillates perpendicular to an incident surface, and p-polarized light, in which the electric field oscillates parallel to the incident surface, excite the localized surface plasmon in the metal structures in different oscillation directions, and the wavelength at which resonance with the metal structure layer occurs differs between the s-polarized light and the p-polarized light. Here, the incident surface is defined by the incident light and an axis perpendicular to the first surface on which the metal structures are arranged.

The metal structures 102 may be covered by a dielectric layer 103 (for example, substrate 103), so that the same reflective index is obtained at an upper surface 104 and a lower surface 105 of each metal structure 102. In this way, unfavorable splitting of spectrum peaks due to a difference in plasmon resonance frequency can be prevented.

In addition, since the metal structures 102 are covered, shifting of peaks due to oxidation of the metal structures 102 or adhesion of dust and the like to the metal structures 102 can also be prevented.

The structure and function of the optical element according to the present invention will now be described.

Figure 2A:
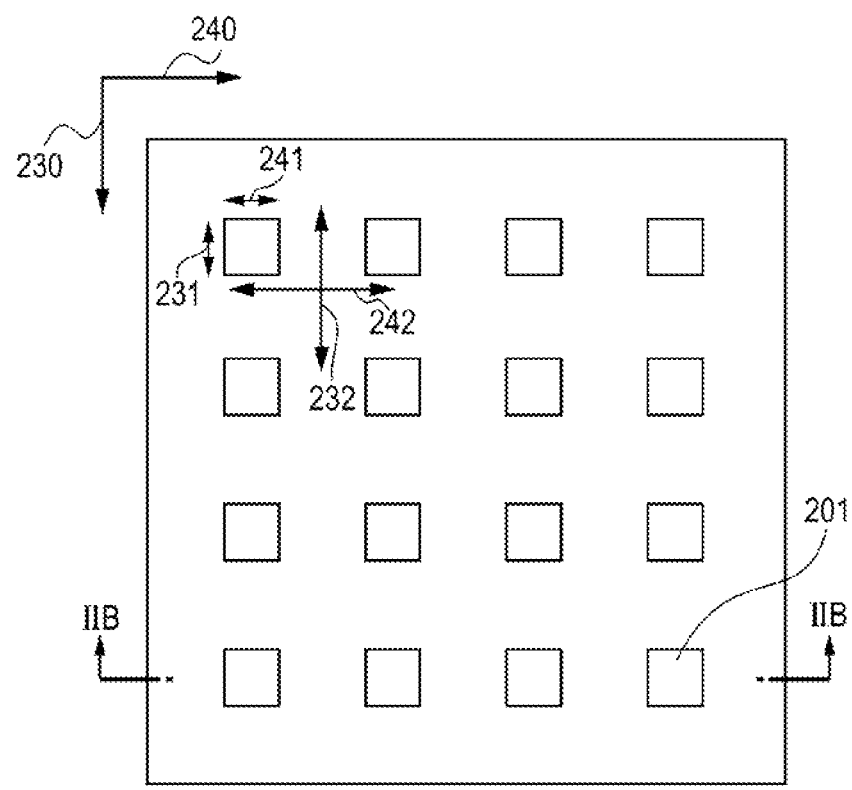
FIG. 2A is a schematic diagram illustrating another embodiment.
Figure 2B:
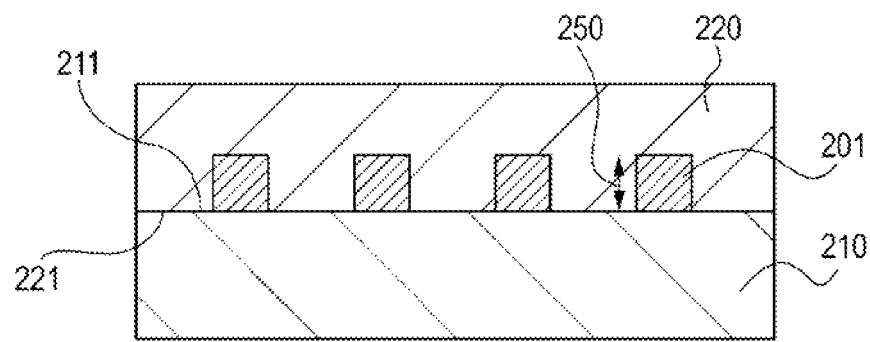
FIG. 2B is another schematic diagram illustrating the embodiment.

FIG. 2A is a top view of components constituting the optical element according to the present invention, and FIG. 2B is a sectional view of FIG. 2A taken along line IIB-IIB. A plurality of metal structures 201 are provided between a first surface 211 of a first dielectric substrate 210 and a first surface 221 of a second dielectric substrate 220. Thus, the metal structures are arranged on the first surface 211 of the dielectric substrate 210, and are covered by the dielectric substrate 220.

The metal structures 201 are two-dimensionally and periodically arranged such that the metal structures 201 are isolated in the planar direction of the first dielectric substrate 210. Thus, the metal structures 201 form a metal structure group.

Referring to FIG. 2A, each metal structure 201 has a first dimension 231 in a first direction 230 and a second dimension 241 in a second direction 240, which is perpendicular to the first direction 230. The first dimension 231 and the second dimension 241 are set to be equal to or less than, for example, the wavelength of light in a visible light range.

Even in the lowest order mode (dipole mode), the half wavelength of the plasmon excited in the metal structures is substantially equal to the dimension of the metal structures.

Thus, the size of the structures in which the plasmon can be excited by the visible light is smaller than the excitation wavelength of the visible light. Therefore, the dimensions of the structures are set to be equal to or smaller than the wavelength of light in the visible light range.

The first dimension 231 and the second dimension 241 can also be set to be equal to or smaller than the plasmon resonance wavelength. In this embodiment, it is assumed that the metal structures 201 have a square shape in which the first dimension and the second dimension are equal to each other. However, the metal structures 201 may also have a circular shape, an oval shape, or a polygonal shape. The shape of the metal structures is not limited to the above-mentioned shapes, and the metal structures may be formed in various kinds of shapes. The first dimension and the second dimension can be considered as the maximum widths of the metal structures.

In the metal structure group shown in FIG. 2A, periods 232 and 242 at which the metal structures 201 are arranged can be equal to or less than the wavelength of light in the visible light range, more preferably, equal to or less than the plasmon resonance wavelength. If the period at which the metal structures are arranged is larger than the intended wavelength range of light, high-order diffracted light is generated and there is a possibility that the intensity of zero-order diffracted light will be reduced.

In addition, a thickness 250 of each metal structure 201 can also be equal to or less than the wavelength of light in the visible light range, more preferably, equal to or less than the plasmon resonance wavelength. This is because if the thickness of each metal structure is too large, the manufacturing error will be increased in the step of forming the structures in the process of manufacturing the filter.

Aluminum, gold, silver, platinum, etc., may be used as the material of the metal structures 201. Among these, aluminum has a plasma frequency higher than that of silver, and therefore a filter with optical characteristics that physically cover the entire visible range can be easily designed (Ag: to 3.8 eV (to 325 nm), Al: to 15 eV (to 83 nm)).

In addition, aluminum has a lower tendency of being oxidized than silver and other materials, and is chemically stable. Therefore, stable optical characteristics can be provided for a long period of time. In addition, the imaginary part of dielectric constant of aluminum is grater than that of silver. Therefore, as compared with sliver, aluminum provides a higher light blocking effect even when a film thickness thereof is reduced. In addition, fine processing of aluminum is relatively easy. In addition, aluminum is chemically very inactive like platinum, and therefore aluminum does not have a disadvantage that fine processing by dry etching is difficult. The metal structures 201 may also be made of mixtures including aluminum, gold, silver, and platinum, or alloys thereof (including metal containing aluminum).

Materials of the first dielectric substrate 210 and the second dielectric substrate 220 may be suitably selected from, for example, quartz (silicon dioxide), which transmits light in the visible light range, metal oxides such as titanium dioxide, or materials having high transmittance, such as silicon nitride.

In addition, high polymer materials, such as polycarbonate and polyethylene terephthalate, may also be used as the materials of the first dielectric substrate 210 and the second dielectric substrate 220.

The difference in dielectric constant between the first dielectric substrate 210 and the second dielectric substrate 220 can be equal to or less than 5 percent.

This is because if the dielectric constant of the first dielectric substrate 210 and that of the second dielectric substrate 220 largely differ from each other, the plasmon excitation wavelength at the boundaries between the first dielectric substrate 210 and the metal structures 201 and that at the boundaries between the second dielectric substrate 220 and the metal structures 201 also largely differ from each other.

As a result, there is a risk that unfavorable peaks of resonance wavelength will be generated or the peak widths will be unfavorably increased. Therefore, preferably, the dielectric constant of the first dielectric substrate 210 and the dielectric constant of the second dielectric substrate 220 are equal to each other.

Figure 3:
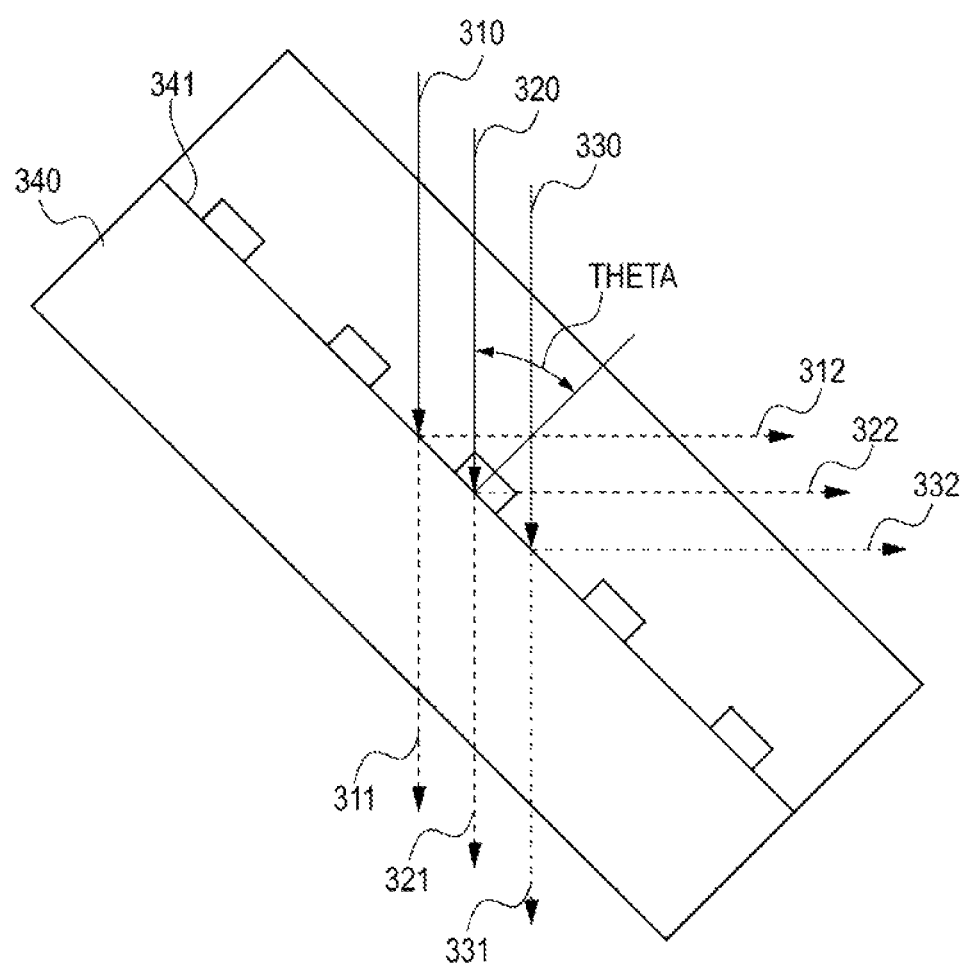
FIG. 3 is a schematic diagram illustrating the function according to an embodiment.

As shown in FIG. 3, it is assumed that incident light 310 having a wavelength lambda 1, incident light 320 having a wavelength lambda 2, and incident light 330 having a wavelength lambda 3 are obliquely incident on the metal structure group through a first surface 341 of a first dielectric substrate 340 at an angle theta with respect to the normal direction of a surface including the metal structure group. In other words, the incident light 310, the incident light 320, and the incident light 330 are obliquely incident on the metal structure group at the angle theta with respect to the normal line of the first surface 341. In this case, the plasmon resonance conditions differ between s-polarized light (in which the electrical field oscillates perpendicular to the page) and p-polarized light (in which the electrical field oscillates parallel to the page) for each of the wavelengths of lambda 1 to lambda 3 in accordance with the dimensions and the period of the metal structures. Although the light is incident from the metal structure side at which the metal structure group is provided on the surface 341 of the substrate 340 in this case, light may also be incident from the substrate-340 side.

As a result, as shown in FIG. 3, for example, the light 310 having the wavelength lambda 1 is divided into transmitted light 311, which is s-polarized, and reflected light 312, which is p-polarized. In addition, light 320 having the wavelength lambda 2 is divided into transmitted light 321, which is p-polarized, and reflected light 322, which is s-polarized. Similarly, the light 330 having the wavelength lambda 3 is divided into the transmitted light 331, which is p-polarized, and reflected light 332, which is s-polarized. Thus, the spectrum of light that is transmitted through the metal structure group and the spectrum of light that is reflected by the metal structure group differ from each other (the polarization states differ from each other), and both the transmitted light and reflected light can be used. The transmitted light and the reflected light are p-polarized and s-polarized, respectively, or vice versa, in accordance with the wavelength range (one of the transmitted light and the reflected light is p-polarized light and the other is s-polarized light). In other words, light in one polarization state and light in the other polarization state are transmitted and reflected, respectively, in a first wavelength range, and are reflected and transmitted, respectively, in a second wavelength range. The number of boundaries between the wavelength ranges is not limited to one. For example, a third wavelength range, a fourth wavelength range, and so on may be designed in which light is transmitted or reflected in accordance with the polarization state.

The relationships between the wavelengths lambda 1 to lambda 3 and whether the s-polarized light and the p-polarized light are transmitted and reflected respectively or vice versa can be controlled by suitably designing the dimensions and the period of the metal structures.

The incident angle theta can be set in the range of 30 degrees or more and 60 degrees or less, in which the plasmon resonance conditions differ in accordance with the polarization state and the contrast of the transmitted light or the reflected light is 1.2 or more.

Here, when designing the optical element according to the present invention, the dimensions and the period of the metal structures in a direction parallel to the incident surface defined by the incident angle theta (in the direction parallel to the page in FIG. 3) can be set to values different from those of the metal structures in a direction perpendicular to the incident surface defined by the incident angle theta (in the direction perpendicular to the page in FIG. 3), in consideration of the light incident angle theta.

For example, when light is incident at the incident angle theta on the metal structures arranged in a square lattice pattern, the effective period and the shape of the lattice pattern of the metal structures viewed in the incident direction of the light differ from those of the square lattice pattern in accordance with the polarization direction. Therefore, the metal structures can also be arranged in an oblong rectangular lattice pattern.

This also applies to the shape of the dots. More specifically, when light is incident on the metal structures at the incident angle theta, the effective shape of the metal structures viewed in the incident direction of the light differs from the shape of the metal structures on a plane. Therefore, the metal structures can also be formed in a shape like an oblong rectangular shape that is anisotropic with respect to the polarization.

In a desired wavelength range, the contrast of transmitted light is defined as the ratio between the transmittance of s-polarized light and that of p-polarized light, and the contrast of reflected light is defined as the ratio between the reflectance of s-polarized light and that of p-polarized light. In this case, the smaller one of the two kinds of contrasts can be equal to or higher than 1.2.

In the transmitted light (or the reflected light) that is transmitted through the optical element according to the present invention, a noise component in background light (light in one polarization state) is generally about 10 percent. Therefore, signal light (light in the other polarization state) can be equal to or more than that, more preferably, is increased by another 10 percent.

Figure 9:
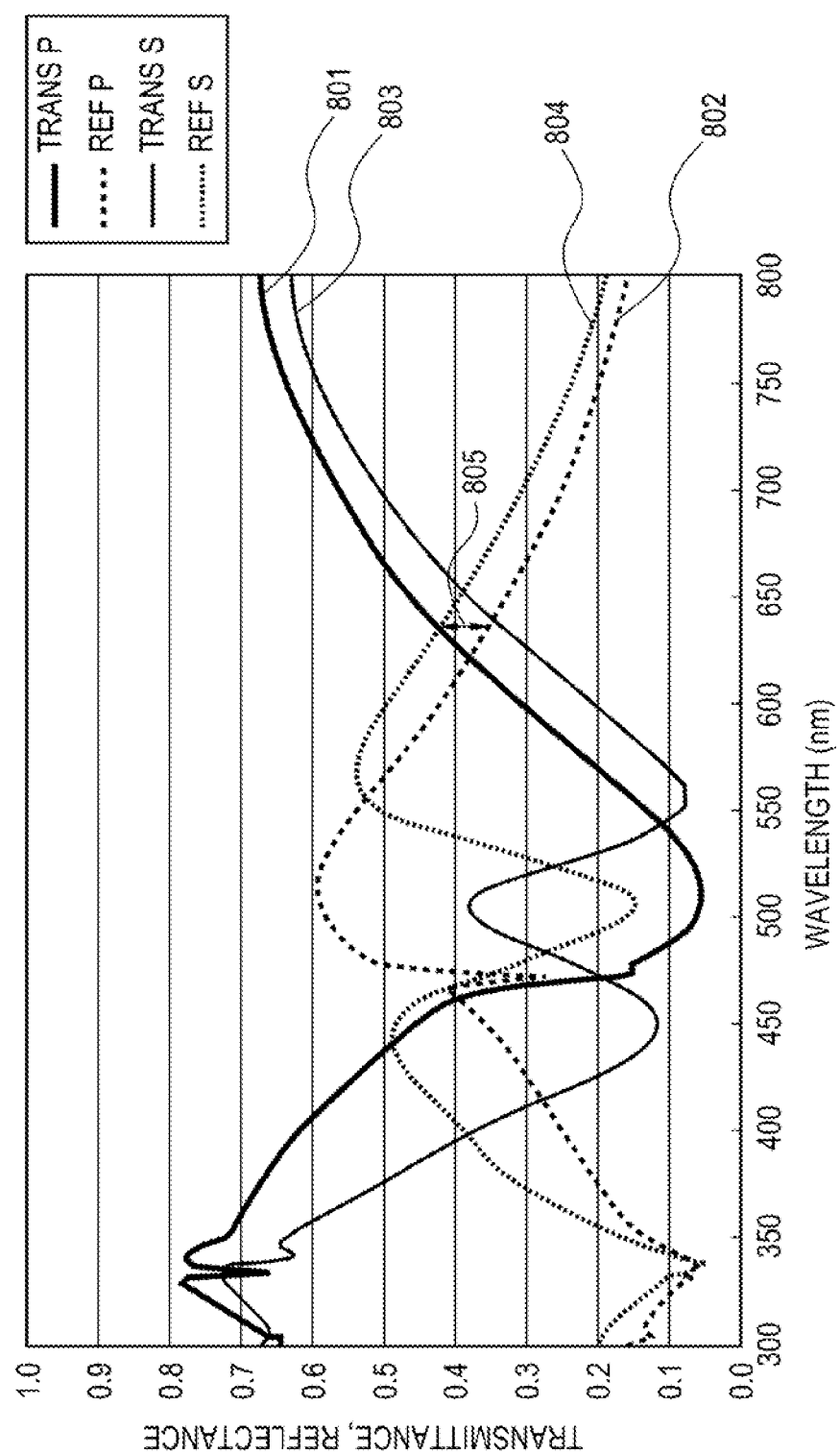
FIG. 9 is a graph of the transmission-reflection spectrum in the case where light is incident on the optical element according to the first embodiment at an angle of 30 degrees.

In FIG. 9, the minimum contrast is shown by reference numeral 805. The minimum contrast is 1.23, and is obtained when the wavelength is 636 nm. These conditions can be satisfied when the incident angle is in the range of 30 degrees or more and 60 degrees or less.

Figure 13:
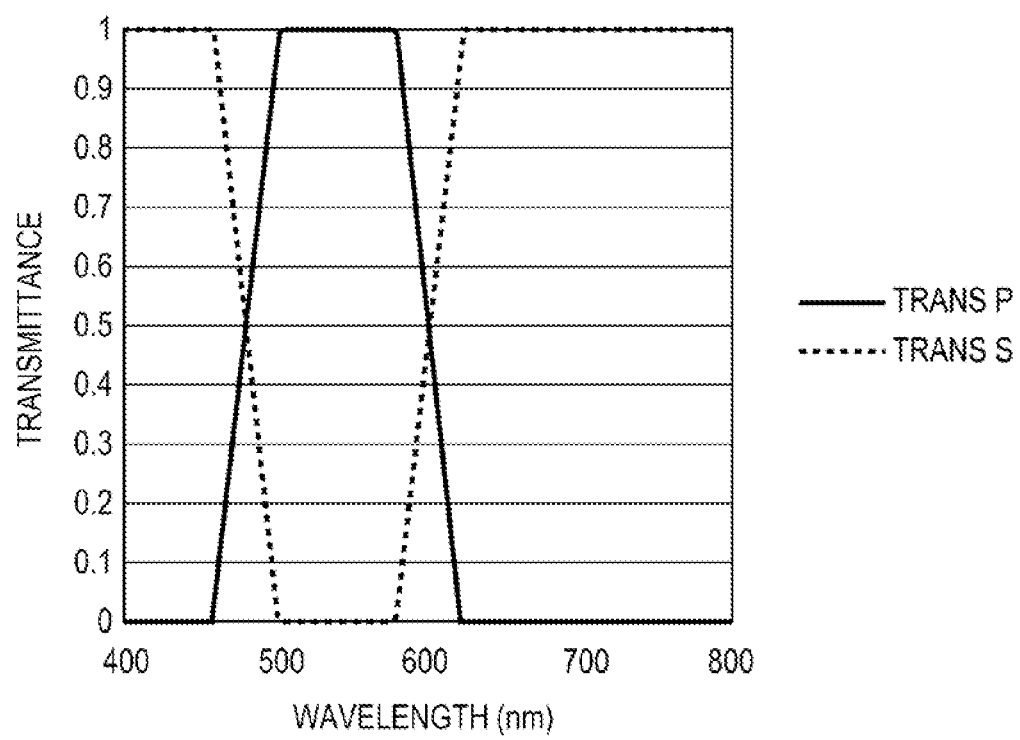
FIG. 13 is a graph illustrating an example of the characteristics of an optical element according to the present invention.
Figure 14:
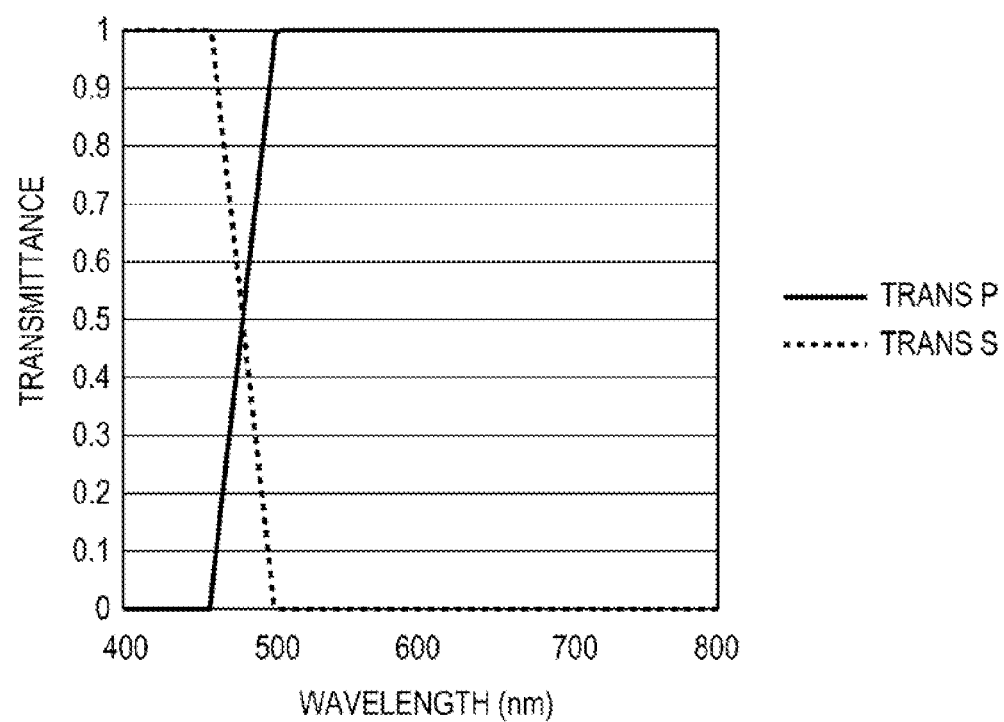
FIG. 14 is a graph illustrating another example of the characteristics of an optical element according to the present invention.
Figure 15:
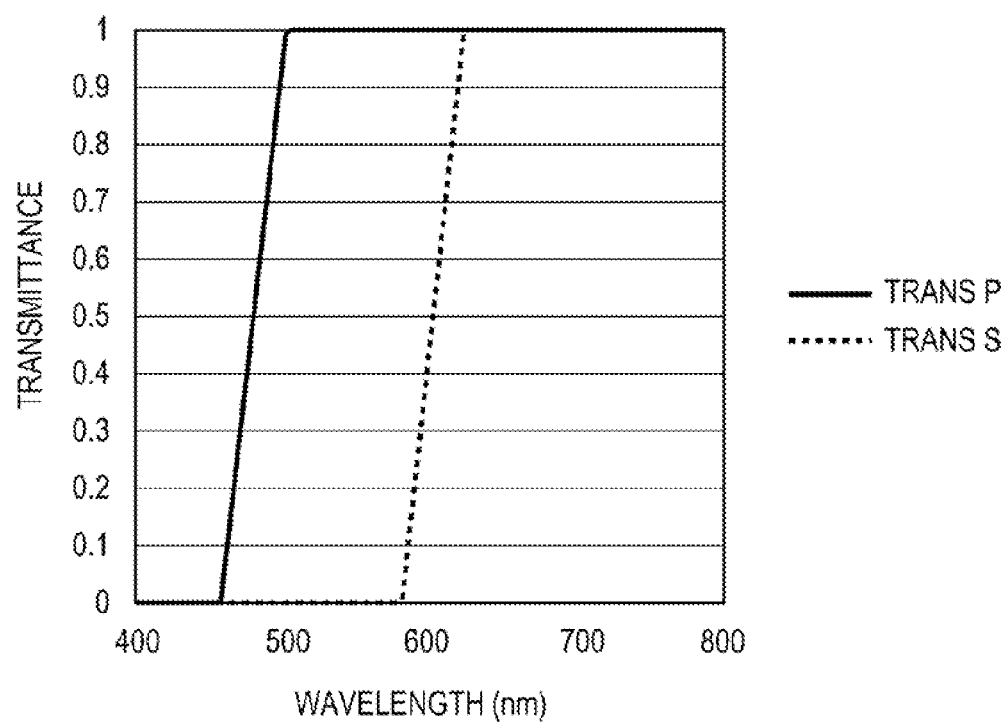
FIG. 15 is a graph illustrating the characteristics of a polarization beam splitter according to the related art.

According to the present invention, an optical element having both the wavelength selecting function and the polarization separating-combining function as shown in FIGS. 13 and 14, for example, can be provided.

According to the example shown in FIG. 13, in the wavelength range of equal to or less than 480 nm, which corresponds to blue light, s-polarized light is transmitted while p-polarized light is reflected. In addition, in the wavelength range of 500 nm to 580 nm, which corresponds to green light, p-polarized light is transmitted while s-polarized light is reflected. In addition, in the wavelength range of 600 nm or more (to 780 nm), which corresponds to red light, s-polarized light is transmitted while p-polarized light is reflected.

In the example shown in FIG. 14, the polarization state in the wavelength range of 600 nm or more differs from that in the example shown in FIG. 13.

The examples shown in FIGS. 13 and 14 are merely examples. The present invention is not limited to these examples, and elements having desired polarization separating-combining function in desired wavelength ranges can be provided. According to the present invention, the metal structures have a first dimension in a first direction and a second dimension in a second direction, which is perpendicular to the first direction. The first dimension and the second dimension may be smaller than the wavelength of visible light.

In addition, the first dimension and the second dimension may be in the range of 90 nm or more and 150 nm or less, and the metal structures may be periodically arranged at a period in the range of 180 nm or more and 300 nm or less. In addition, the thickness of the metal structures may be in the range of 10 nm or more and 150 nm or less.

An optical element according to the present invention may be included in a spectroscope including a detector (light-detecting element) and the optical element according to the present invention. In addition, the optical element according to the present invention may also be included in an optical device, such as a liquid crystal projector, a color copy machine, a television camera, a color printer, a facsimile machine, etc., to constitute the optical device.

The present invention also includes the above-mentioned devices including the optical element according to the present invention.

Embodiments

Although the present invention will be described in detail below with reference to the embodiments thereof, the technical scope of the present invention is not limited to the embodiments described below, and various modifications are possible on the basis of the technical idea described in the claims.

First Embodiment

In a first embodiment, a manufacturing method and optical characteristics of an optical element (hereinafter referred to also as "dichroic PBS") according to the present invention will be described. This optical element includes a dielectric layer between a first substrate and a second substrate and has both the wavelength selecting function and the polarization separating-combining function.

Figure 4A:
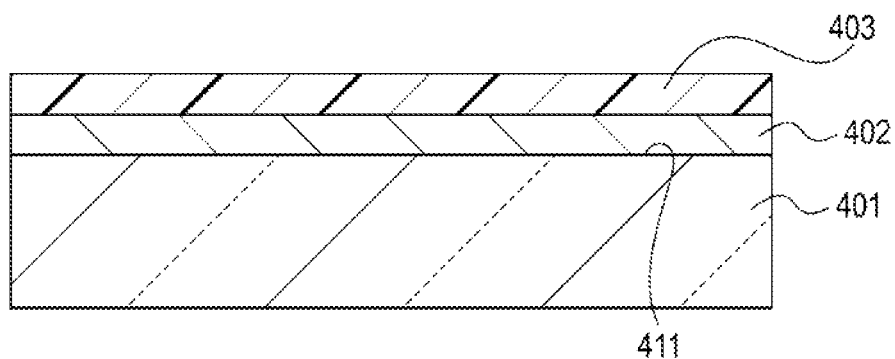
FIG. 4A is a schematic diagram illustrating a manufacturing method according to a first embodiment.

Referring to FIG. 4A, a thin metal layer 402 is formed by depositing aluminum to a thickness of 30 nm on a first surface 411 of a first dielectric substrate 401 composed of a quartz substrate with a thickness of 525 micrometers. Then, a layer of electron beam (EB) lithography resist 403 is formed on the thin metal layer 402 by application.

The method for forming the thin metal layer 402 is not limited to deposition, and may also be, for example, sputtering. Then, a pattern is formed in the resist 403 by using an EB lithography apparatus.

The thus-obtained resist pattern is a square lattice pattern in which squares with sides of about 120 nm are arranged at a period of about 240 nm.

Then, metal structures 404 are formed by dry etching using the resist pattern as an etching mask and plasma of mixed gas of chlorine and oxygen as etching gas.

The dry etching gas is not limited to the mixture of chlorine and oxygen, and other gasses, such as argon, may also be used. In addition, the method for manufacturing the etching mask is not limited to EB lithography, and the etching mask may also be manufactured by, for example, photolithography.

Alternatively, the pattern in the thin metal layer 402 may also be formed as follows. That is, first, a resist pattern is formed on the first surface 411 of the first dielectric substrate 401 by EB lithography or photolithography. Then, the thin metal layer 402 is formed and a lift-off process is performed.

Figure 4B:
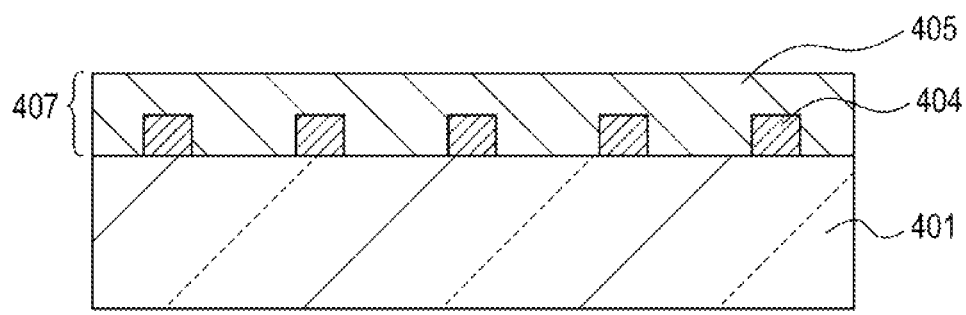
FIG. 4B is another schematic diagram illustrating the manufacturing method according to the first embodiment.
Figure 5A:
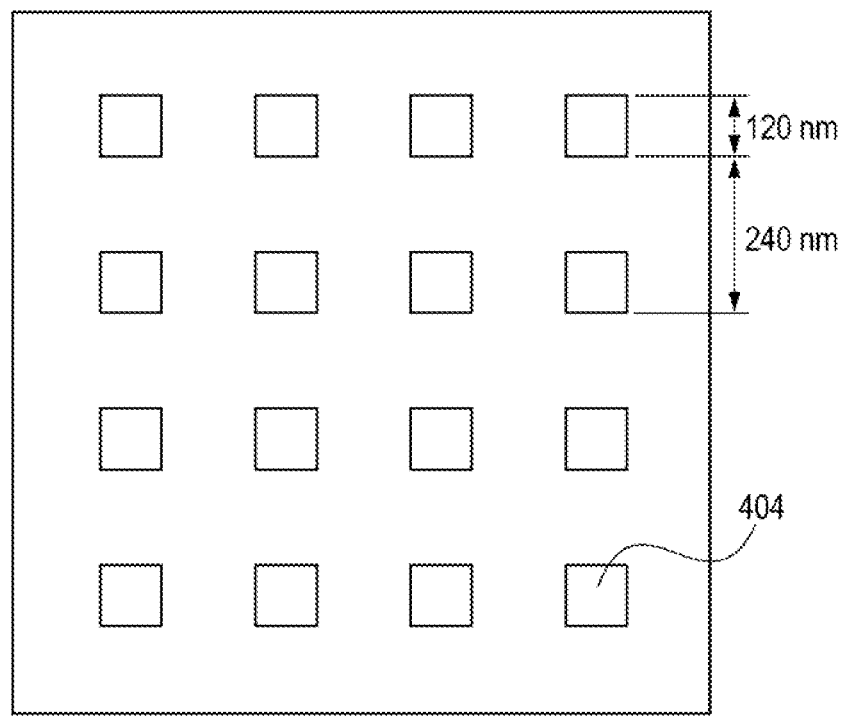
FIG. 5A is another schematic diagram illustrating the manufacturing method according to the first embodiment.

The thin metal layer 402 may also be formed directly by using a focused ion-beam (FIB) processing apparatus. Then, a quartz thin film with a thickness of 100 nm is formed by sputtering on the metal structures 404 as a dielectric layer 405. A sectional view and a top view of the thus-obtained optical element are shown in FIGS. 4B and 5A, respectively.

Figure 5B:
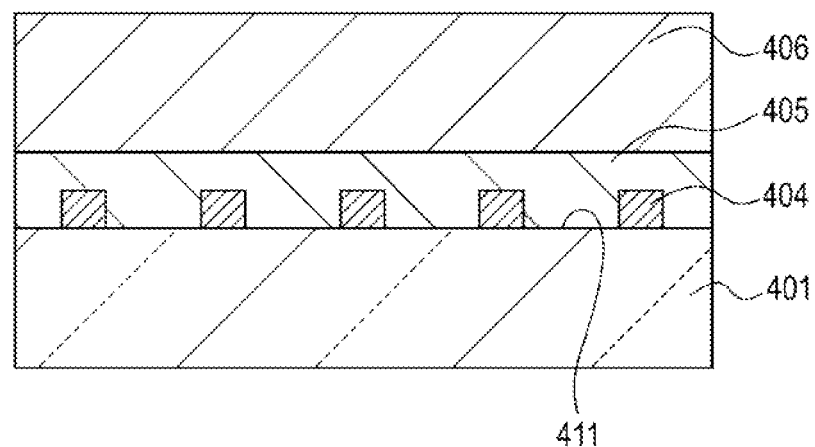
FIG. 5B is another schematic diagram illustrating the manufacturing method according to the first embodiment.

The dielectric layer may also be formed by chemical vapor deposition (CVD) or a spin-on-glass (SOG) method instead of sputtering. Thus, a metal structure layer 407 is formed on the surface of the first dielectric substrate 401. FIG. 5B shows the structure in which a second dielectric substrate 406 is adhered to the first dielectric substrate 401 including the metal structure layer 407 by adhesion, anode coupling, or other methods.

The first dielectric substrate and the second dielectric substrate are not limited to planar substrates such as quartz substrates, and prism-shaped substrates may also be used.

Figure 6A:
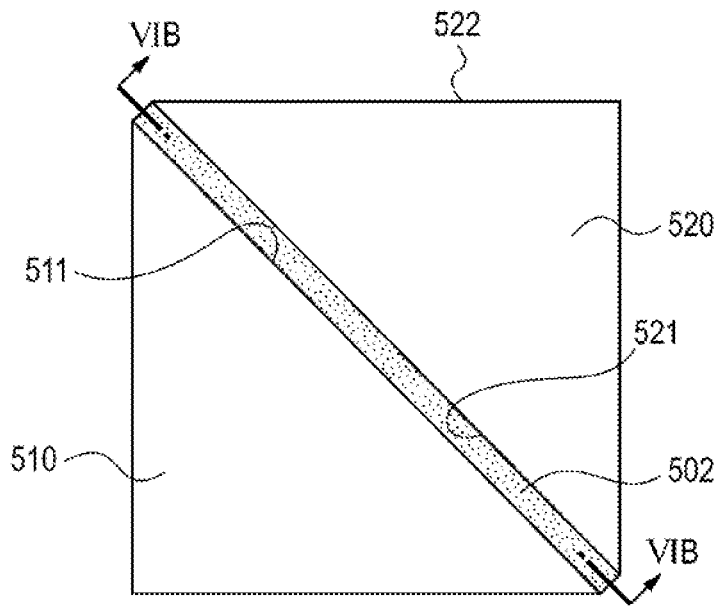
FIG. 6A is a schematic diagram illustrating an optical element according to the first embodiment.
Figure 6B:
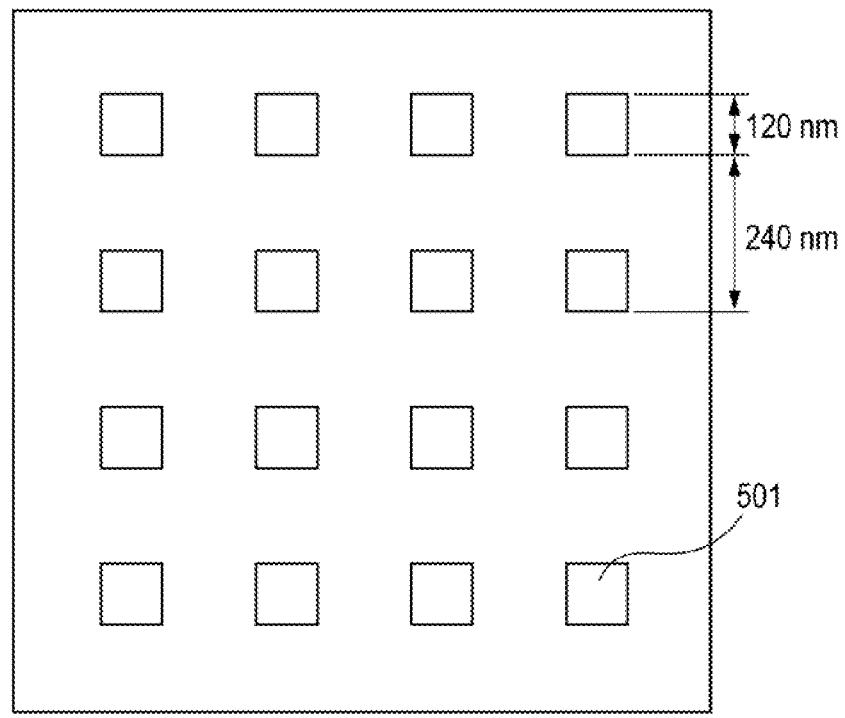
FIG. 6B is another schematic diagram illustrating the optical element according to the first embodiment.

FIGS. 6A and 6B illustrate a cube-shaped dichroic PBS obtained by combining two prisms. A metal structure layer 502 in which a plurality of metal structures 501 are covered with a dielectric layer is disposed between a first surface 511 of a first dielectric substrate 510 and a first surface 521 of a second dielectric substrate 520. FIG. 6A shows the top view of the dichroic PBS, and FIG. 6B is a sectional view of FIG. 6A taken along line VIB-VIB.

Figure 7:
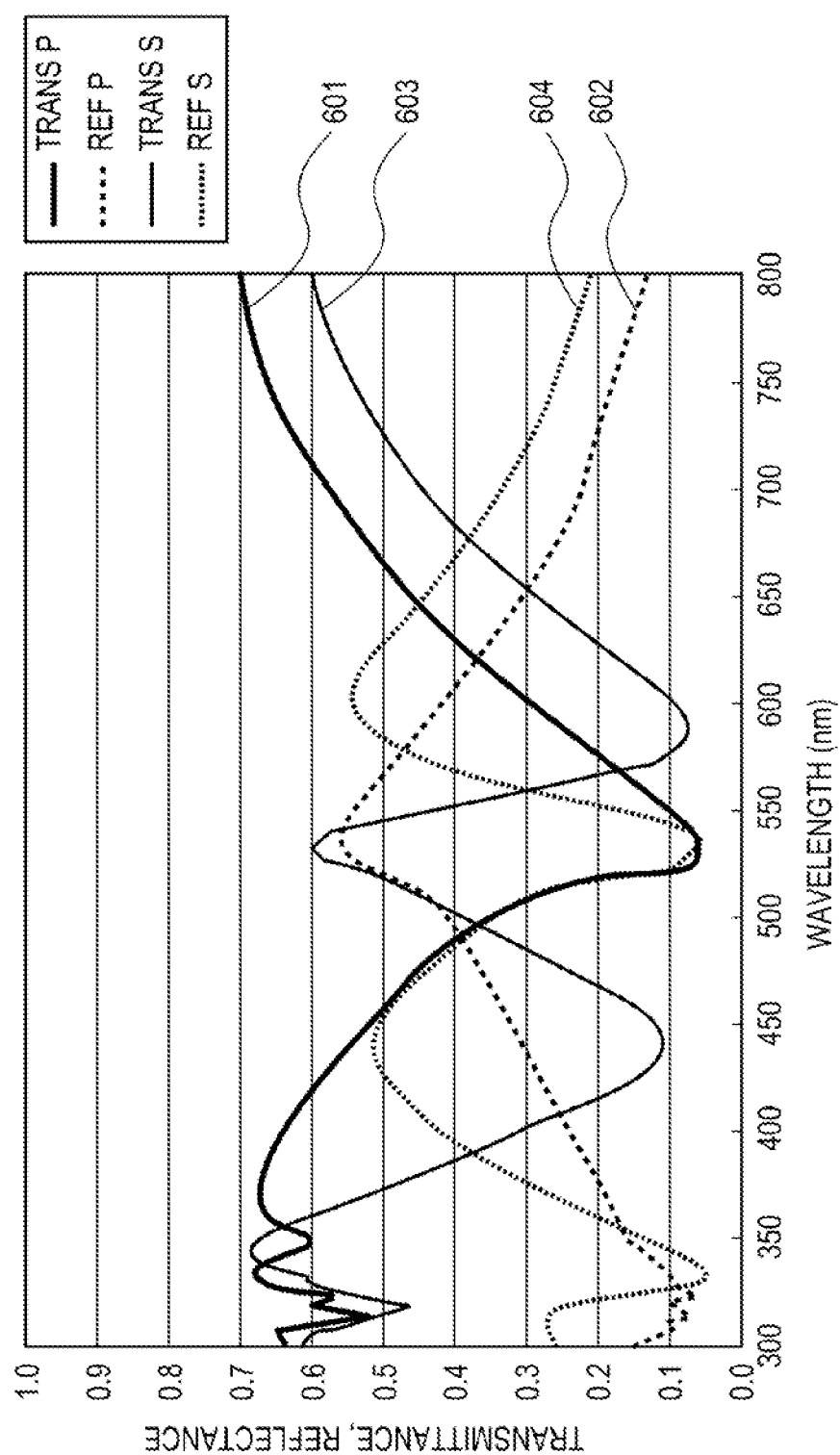
FIG. 7 is a graph of the transmission-reflection spectrum in the case where light is incident on the optical element according to the first embodiment at an angle of 45 degrees.

Light is incident on the dichroic PBS through a second surface 522 of the second dielectric substrate. In the metal structure layer 502, a pattern in which squares with sides of 120 nm are arranged at a period of 240 nm is formed using aluminum as the metal, and the thickness of the metal structure layer 502 is 30 nm. FIG. 7 shows the calculation result of the transmission spectrum and reflection spectrum of s-polarized light and p-polarized light obtained when light is incident on the metal structure layer 502 at an angle of 45 degrees with respect to the axis perpendicular to the metal structure layer 502.

In FIG. 7, reference numeral 601 denotes the transmittance of p-polarized light, 602 denotes the reflectance of p-polarized light, 603 denotes the transmittance of s-polarized light, and 604 denotes the reflectance of s-polarized light. In G-light (green light) with the wavelength of around 530 nm, the transmittance of s-polarized light and the reflectance of p-polarized light have local maxima, while the reflectance of s-polarized light and the transmittance of p-polarized light have relative minima. In addition, in B-light (blue light) with the wavelength of around 430 nm and R-light (red light) with the wavelength of around 630 nm, the reflectance of s-polarized light and the transmittance of p-polarized light are about 1.5 times as large as the transmittance of s-polarized light and the reflectance of p-polarized light, respectively.

Figure 8:
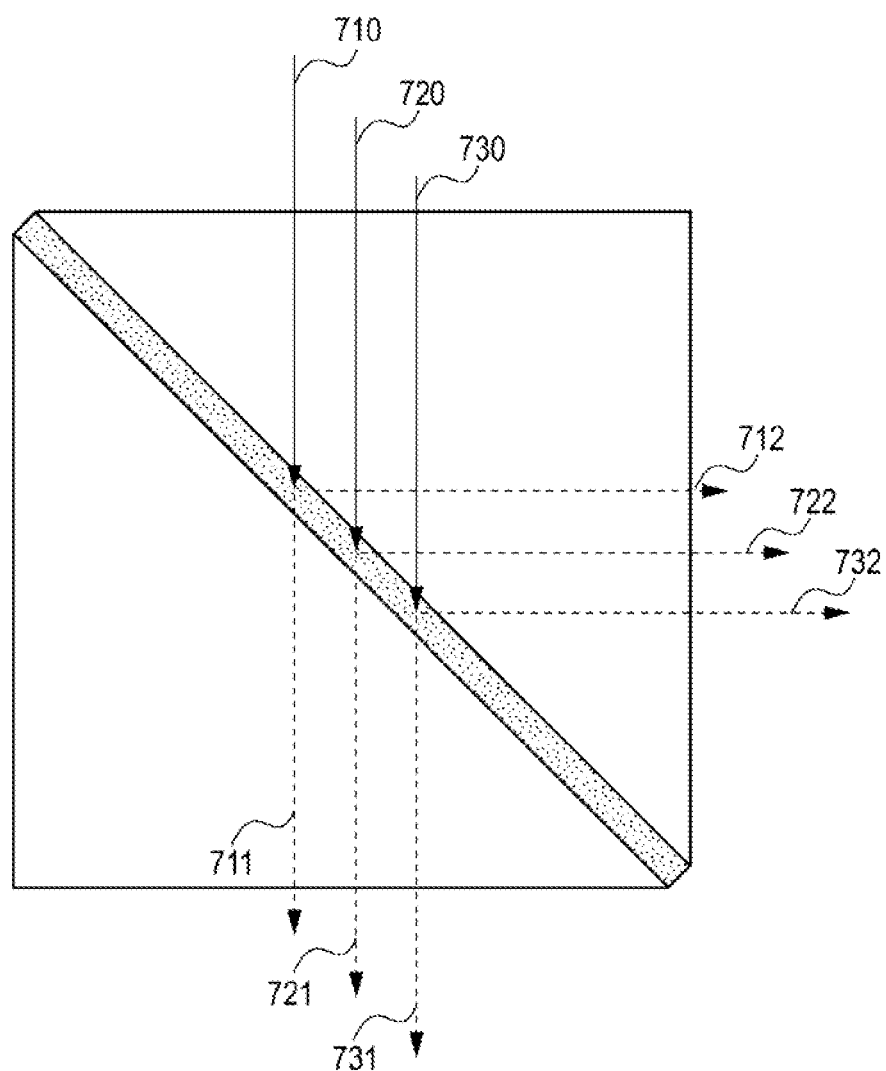
FIG. 8 is a schematic diagram illustrating the function of the optical element according to the first embodiment.

FIG. 8 shows the conceptual diagram of the above-described function. When light, including R-light 710, G-light 720, and B-light 730 is incident on the dichroic PBS 701, p-polarized R-light 711, s-polarized G-light 721, and p-polarized B-light 731 are transmitted, while s-polarized R-light 712, p-polarized G-light 722, and s-polarized B-light 732 are reflected.

Figure 10:
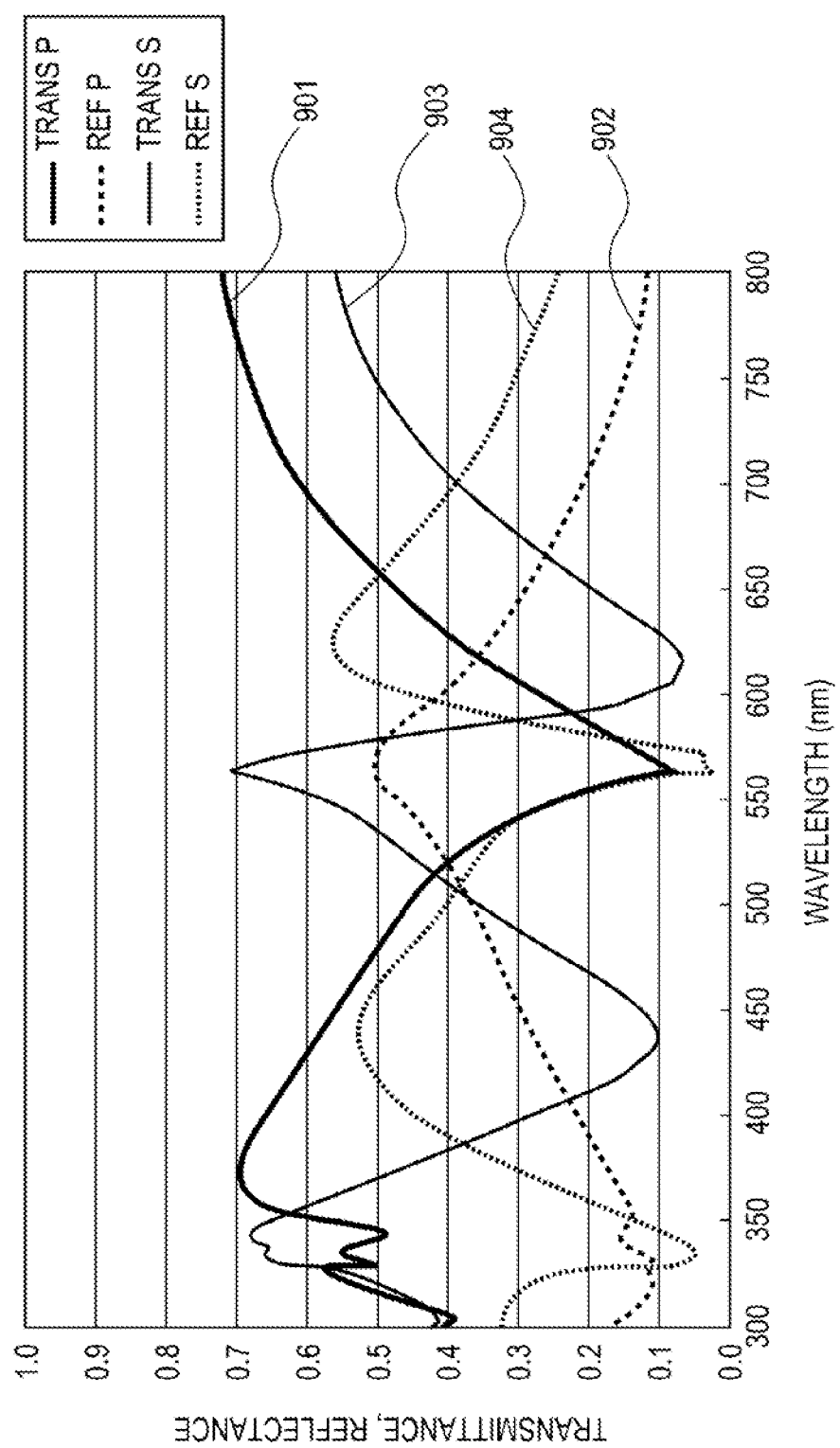
FIG. 10 is a graph of the transmission-reflection spectrum in the case where light is incident on the optical element according to the first embodiment at an angle of 60 degrees.

FIGS. 9 and 10 show the calculation results for when the incident angle of light on an optical element similar to the above-described optical element is 30 degrees and 60 degrees, respectively. In both cases, the tendency is similar to that shown in FIG. 7 in which the incident angle is 45 degrees.

Second Embodiment

A color separating-combining optical system including the optical element according to the present invention will be described with reference to FIG. 11.

In the present embodiment, a dichroic PBS 1001 according to the present invention includes a metal structure group having a structure similar to that described in the first embodiment. In other words, the dichroic PBS 1001 is an optical element including a member that has the optical characteristics shown in FIG. 7. The relationship between the wavelength and the polarization state is merely an example, and can be arbitrarily set in accordance with the design of the metal structure group.

Figure 11:
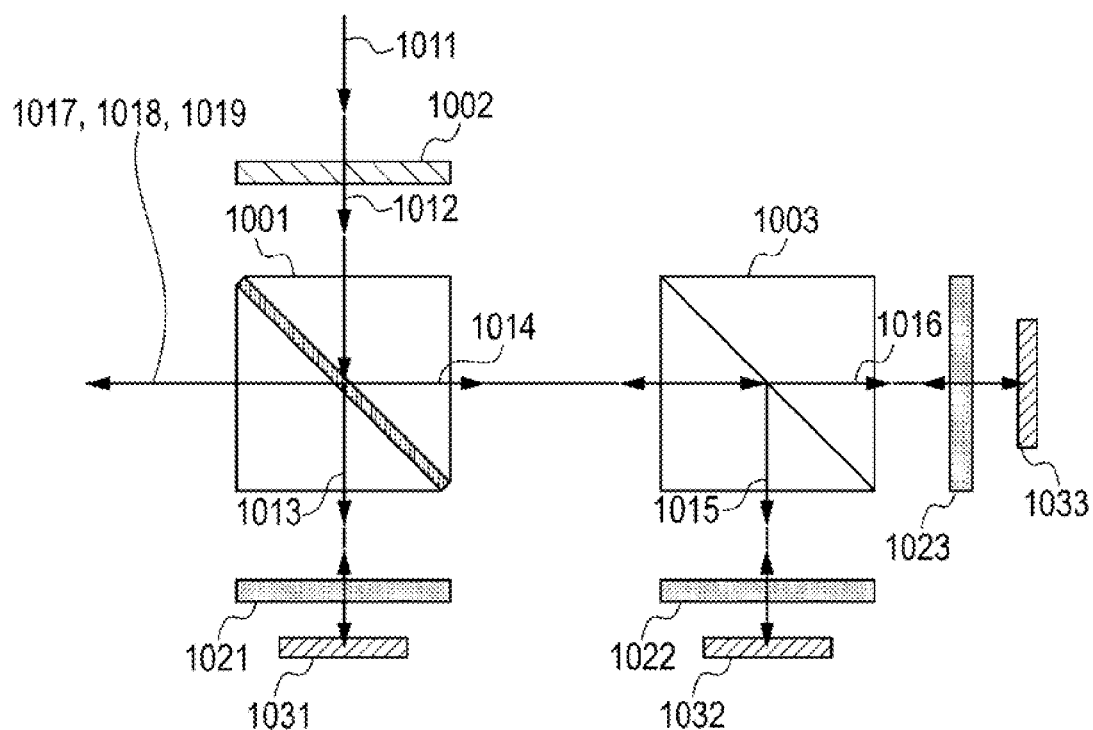
FIG. 11 is a schematic diagram illustrating a color separating-combining optical system according to a second embodiment.

As shown in FIG. 11, light 1011 is caused to pass through a polarizer 1002, so that only s-polarized light is used as incident light 1012. The incident light 1012 is divided into transmitted light 1013 and reflected light 1014 by the dichroic PBS 1001. Referring to the optical characteristics shown in the graph in FIG. 7, the transmitted light 1013 has the wavelength of G-light (green light), and the reflected light 1014 has the wavelength of Mg-light (red light and blue light). First, the optical path of G-light will be described. The transmitted light 1013, which is the s-polarized G-light, is converted into circularly polarized light when passing through a quarter wavelength plate 1021, is reflected by a mirror 1031, is converted into p-polarized light when passing through the quarter wavelength plate 1021 again, and returns to the dichroic PBS 1001. Owing to the optical characteristics of the dichroic PBS 1001, the p-polarized G-light is reflected and is output as outgoing light 1018.

The reflected light 1014 that exits the dichroic PBS 1001 is incident on a dichroic prism 1003, and is divided into reflected light 1015, which is s-polarized R-light (red light), and transmitted light 1016, which is s-polarized B-light (blue light). Similar to the transmitted light 1013 that exits the dichroic PBS 1001, the reflected light 1015 and the transmitted light 1016 respectively pass through the quarter wavelength plates 1022 and 1023 twice by being reflected by mirrors 1032 and 1033, return to the dichroic prism 1003 as p-polarized light, and are combined together again. The thus-combined p-polarized R-light and p-polarized B-light return to the dichroic PBS 1001, are transmitted by the dichroic PBS 1001, owing to the optical characteristics thereof, and are emitted as outgoing R-light 1017 and outgoing B-light 1019.

Thus, the incident light 1011 is divided into lights of three colors, that is, R, B, and B, and the R-light 1017, G-light 1018, and B-light 1019 are combined together at the outgoing side. The order of the lights of three colors is not limited to this, and a PBS, for example, may be used instead of the polarizer. Thus, the present invention is not limited to the systems described herein.

Third Embodiment

Figure 12:
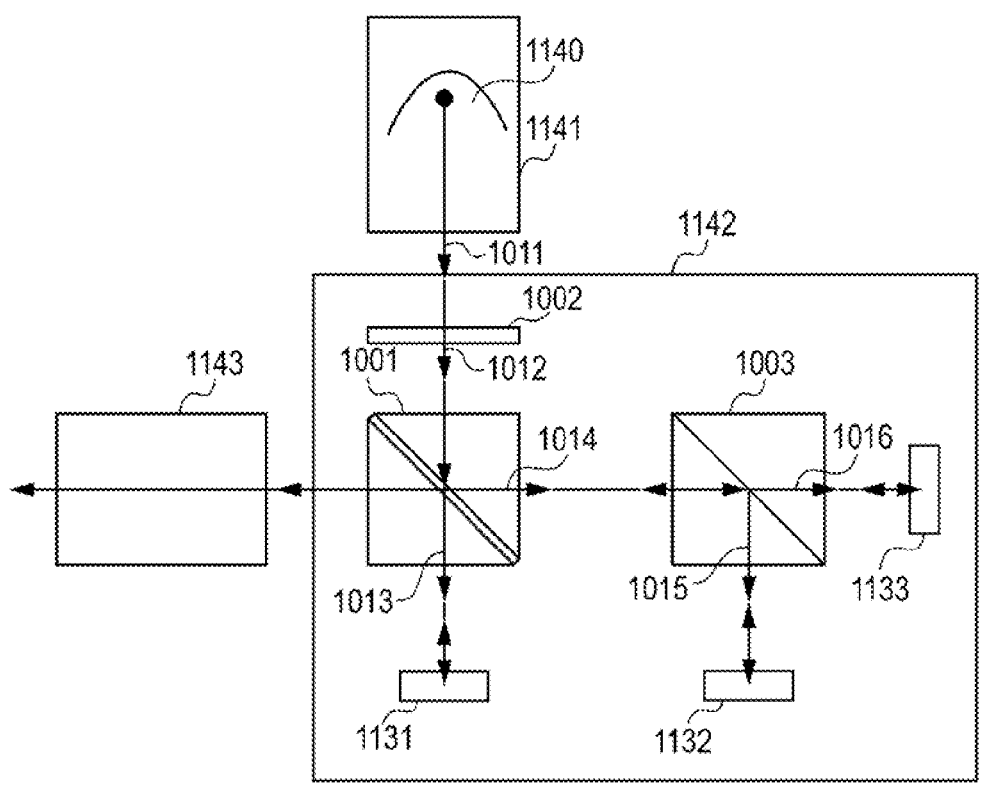
FIG. 12 is a schematic diagram illustrating a projecting device according to a third embodiment.

FIG. 12 is a schematic diagram illustrating a projecting device in which the color separating-combining optical system described in the second embodiment is used in combination with a reflective liquid crystal display element (LCOS), an illumination optical system including a light source, and a projection optical system.

White light emitted from a light source 1140 is transmitted through an illumination optical system 1141 and is incident on a color separating-combining optical system 1142. In general, the illumination optical system is a combination of a lens array, a capacitor, etc., and serves to divide light into a plurality of light components and collect the light components after making the illumination uniform. Therefore, light with a uniform illumination distribution is emitted. Then, in the color separating-combining optical system 1142, image information is provided for each color of R, G, and B.

The color separating-combining operation is performed in a manner similar to that in the above-described second embodiment. In FIG. 12, LCOSs 1131, 1132, and 1133 are provided for the respective colors in place of the mirrors 1031, 1032, and 1033 and the quarter wavelength plates 1021, 1022, and 1023 shown in FIG. 11.

Each pixel of an image to be projected can be switched between a display state and a non-display state depending on whether or not the linear polarization is rotated, which depends on a voltage applied to the corresponding pixel in each LCOS. Here, G-light will be described as an example. When s-polarized G-light is incident on the LCOS 1131, the s-polarized G-light is rotated and converted into p-polarized G-light in pixels to be displayed in accordance with image information. In pixels which are not to be displayed, the s-polarized G-light is reflected without being rotated. Then, the G-light having image information returns to the dichroic PBS, where the p-polarized G-light is reflected and guided toward a projection optical system 1143 and the s-polarized G-light is transmitted and returns to the light source. Similarly, R-light and B-light receive image information at the LCOSs 1132 and 1133, respectively, and are guided to the projection optical system 1143. Then, an operation of magnifying the image and bringing the image into focus is performed by the projection optical system 1143, and light obtained as a result of this operation is emitted from the projection optical system 1143. In the system of the present embodiment, quarter wavelength plates may be placed in front of the LCOSs to prevent reduction in contrast. Thus, the present embodiment is not limited to the above-described system.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-004757, filed Jan. 13, 2009, which is hereby incorporated by reference herein in its entirety.

REFERENCE SIGNS LIST 101 dielectric substrate
102 metal structure
103 dielectric substrate
104 upper surface of metal structures
105 lower surface of metal structure
201 metal structure
210 first dielectric substrate
211 first surface of first dielectric substrate
220 second dielectric substrate
221 first surface of first dielectric substrate
230 first direction
231 first dimension
232 first period
240 second direction
241 second dimension
242 second period
250 thickness of metal structure
310 incident light with wavelength lambda 1
311 transmitted light with wavelength lambda 1
312 reflected light with wavelength lambda 1
320 incident light with wavelength lambda 2
321 transmitted light with wavelength lambda 2
322 reflected light with wavelength lambda 2
330 incident light with wavelength lambda 3
331 transmitted light with wavelength lambda 3
332 reflected light with wavelength lambda 3
340 first dielectric substrate
341 second surface of first dielectric substrate
401 first dielectric substrate
402 first surface of first dielectric substrate
403 resist
404 metal structure
405 dielectric layer
406 second dielectric substrate
411 first surface of first dielectric substrate
501 metal structure
502 metal structure layer
510 first dielectric substrate
511 first surface of first dielectric substrate
520 second dielectric substrate
521 first surface of second dielectric substrate
522 second surface of second dielectric substrate
601 transmittance of p-polarized light
602 reflectance of p-polarized light
603 transmittance of s-polarized light
604 reflectance of s-polarized light
710 incident R-light
711 transmitted R-light
712 reflected R-light
720 incident G-light
721 transmitted G-light
722 reflected G-light
730 incident B-light
731 transmitted B-light
732 reflected B-light
801 transmittance of p-polarized light
802 reflectance of p-polarized light
803 transmittance of s-polarized light
804 reflectance of s-polarized light
901 transmittance of p-polarized light
902 reflectance of p-polarized light
903 transmittance of s-polarized light
904 reflectance of s-polarized light
1001 dichroic PBS
1002 polarizer
1003 dichroic prism
1011 incident light
1012 light outgoing from polarizer
1013 G-light 1014 Mg-light
1015 R-light
1016 B-light
1017 outgoing R-light
1018 outgoing G-light
1019 outgoing B-light
1131 reflective liquid crystal display element
1132 reflective liquid crystal display element
1133 reflective liquid crystal display element
1140 light source
1141 illumination optical system
1142 color separating-combining optical system
1143 projection optical system

The invention claimed is:

1. An optical element, comprising:
a substrate including a first surface; and
a metal structure group including a plurality of three-dimensional metal structures, each of the metal structures having a first dimension in a first direction and a second dimension in a second direction perpendicular to the first direction, and having a thickness in a third direction, the metal structures made of metal containing aluminum and being arranged on the first surface of the substrate in a two-dimensional array of rows and columns in an isolated manner,
wherein the metal structures are capable of generating localized surface plasmon resonance by receiving light incident thereupon,
wherein each dimension of each of the metal structures in the first, second and third directions is equal to or less than a wavelength of light in a visible light range;
wherein the incident light is incident on the metal structure group in an oblique manner with respect to the normal to the first surface of the substrate,
wherein the incident light is divided into transmitted light that passes through the metal structure group and reflected light that is reflected by the metal structure group,
wherein transmittance of light having a first polarization state has a minimum value in a first wavelength range of the incident light, and transmittance of light having a second polarization state has a minimum value in a second wavelength range of the incident light, and the first wavelength range and the second wavelength range are different from each other, and
wherein the first dimension and the second dimension are in the range of 90 nm or more and 150 nm or less, and the thickness in the third direction is in the range of 10 nm or more and 150 nm or less, and the metal structures are periodically arranged at a period in the range of 180 nm or more and 300 nm or less.

2. The optical element according to claim 1, wherein the first polarization state is a p-polarized state and the second polarization state is a s-polarized state.

3. The optical element according to claim 1, wherein an angle between the incident light incident on the metal structure group in the oblique manner and the normal to the first surface is in the range of 30 degrees or more to 60 degrees or less.

4. The optical element according to claim 1, wherein the metal structures are periodically arranged in the metal structure group.

5. The optical element according to claim 4, wherein a separation between the metal structures is smaller than the wavelength of visible light.

6. The optical element according to claim 5, wherein the first dimension and the second dimension are smaller than the wavelength of visible light.

7. The optical element according to claim 4, wherein a period at which the metal structures are arranged parallel to an incident surface defined by an incident angle of the light incident on the metal structure group in the oblique manner with respect to the normal to the first surface differs from a period at which the metal structures are arranged perpendicular to the incident surface defined by the incident angle.

8. The optical element according to claim 1, wherein the metal structure group is covered with a dielectric member.

9. A color separating-combining optical system comprising:
the optical element according to claim 1.

10. A projecting device comprising:
an illumination optical system including a light source;
the color separating-combining optical system according to claim 9; and
a projection optical system.

11. An optical element, comprising:
a substrate including a first surface; and
a metal structure group including a plurality of three-dimensional metal structures, each of the metal structures having a first dimension in a first direction and a second dimension in a second direction perpendicular to the first direction, and having a thickness in a third direction, the metal structures being arranged on the first surface of the substrate in a two-dimensional array of rows and columns in an isolated manner,
wherein the metal structures are capable of generating localized surface plasmon resonance by receiving light incident thereupon,
wherein each dimension of each of the metal structures in the first, second and third directions is equal to or less than a wavelength of light in a visible light range,
wherein the incident light is incident on the metal structure group in an oblique manner with respect to the normal to the first surface of the substrate,
wherein the incident light is divided into transmitted light that passes through the metal structure group and reflected light that is reflected by the metal structure group,
wherein a transmittance of light having a first polarization state has a minimum value in a first wavelength range of the incident light, a transmittance of light having a second polarization state has a minimum value in a second wavelength range of the incident light, and the first wavelength range and the second wavelength range are different from each other, and
wherein the first dimension and the second dimension are in the range of 90 nm or more and 150 nm or less, the thickness in the third direction is in the range of 10 nm or more and 150 nm or less, and the metal structures are periodically arranged at a period in the range of 180 nm or more and 300 nm or less.

* * * * *